(12) United States Patent
Nishimura et al.

(10) Patent No.: US 8,141,227 B2
(45) Date of Patent: Mar. 27, 2012

(54) ASSEMBLY OF SHEET MATERIALS, TUBE ASSEMBLY, DRAWING METHOD AND TOOLS FOR DRAWING

(75) Inventors: Makoto Nishimura, Kanagawa-ken (JP); Chigaya Sekine, Tokyo (JP)

(73) Assignee: Kabushiki Kaisha Hitachi Seisakusho, Tokyo (JP)

( * ) Notice: Subject to any disclaimer, the term of this patent is extended or adjusted under 35 U.S.C. 154(b) by 146 days.

(21) Appl. No.: 12/230,840

(22) Filed: Sep. 5, 2008

(65) Prior Publication Data

US 2009/0007409 A1    Jan. 8, 2009

Related U.S. Application Data

(62) Division of application No. 10/721,162, filed on Nov. 26, 2003, now abandoned.

(30) Foreign Application Priority Data

Nov. 29, 2002 (JP) .................................. 2002/349206
May 30, 2003 (JP) .................................. 2003/154795

(51) Int. Cl.
*B21D 39/00* (2006.01)
*B23P 11/00* (2006.01)

(52) U.S. Cl. . 29/524.1; 29/521; 29/243.53; 29/243.529; 29/243.522; 29/516; 29/243.517

(58) Field of Classification Search ............ 29/516, 29/521, 524.1, 243.517, 243.518, 243.522, 29/243.529, 243.53
See application file for complete search history.

(56) References Cited

U.S. PATENT DOCUMENTS

| | | | | |
|---|---|---|---|---|
| 2,288,308 A | * | 6/1942 | Williams | 29/566 |
| 2,902,857 A | * | 9/1959 | Wangelin et al. | 73/61.76 |
| 3,333,319 A | * | 8/1967 | Taylor | 29/894.342 |
| 3,555,831 A | * | 1/1971 | Pogonowski | 405/227 |
| 3,877,282 A | * | 4/1975 | Pogonowski | 72/393 |
| 3,885,298 A | * | 5/1975 | Pogonowski | 29/507 |
| 3,973,824 A | | 8/1976 | Chor | |
| 3,976,385 A | | 8/1976 | Klopfer | |

(Continued)

FOREIGN PATENT DOCUMENTS

JP    62-10921    1/1987

(Continued)

OTHER PUBLICATIONS

Japanese Office Action (with English translation of substantive portions) issued Jul. 29, 2009 in corresponding Japanese Patent Application No. 2003-154795).

*Primary Examiner* — Essama Omgba
(74) *Attorney, Agent, or Firm* — Wenderoth, Lind & Ponack, LLP

(57) ABSTRACT

An assembly of sheet materials in which a first sheet of material and a second sheet of material are disposed in an overlapping relationship, with a plurality of joint portions being formed therebetween by drawing an overlapping part of the first and second sheets of materials at a plurality of positions. The plurality of joint portions includes at least one first joint portion in which the first sheet of material is laterally extruded into the second sheet of material and at least one second joint portion in which the first sheet of material and the second sheet of material are in contact with each other in a cup-like surface configuration.

16 Claims, 9 Drawing Sheets

U.S. PATENT DOCUMENTS

| | | | |
|---|---|---|---|
| 4,208,776 A * | 6/1980 | Schleicher | 29/243.5 |
| 4,394,794 A * | 7/1983 | Shirey | 29/432 |
| 4,632,592 A | 12/1986 | Gunter | |
| 4,831,704 A | 5/1989 | Rapp | |
| 4,836,705 A | 6/1989 | La Barge et al. | |
| 4,998,337 A | 3/1991 | Tiekink | |
| 5,072,655 A | 12/1991 | Adler | |
| 5,230,136 A | 7/1993 | Cronn et al. | |
| 5,305,517 A | 4/1994 | Schleicher | |
| 5,432,989 A * | 7/1995 | Turek | 29/243.5 |
| 5,498,096 A | 3/1996 | Johnson | |
| 5,528,815 A * | 6/1996 | Webb | 29/509 |
| 5,782,130 A | 7/1998 | Sawdon | 72/481.8 |
| 5,984,563 A * | 11/1999 | Wu | 403/282 |
| 6,217,115 B1 * | 4/2001 | Downey et al. | 297/330 |
| 6,651,300 B1 * | 11/2003 | Muller | 29/243.5 |
| 6,676,000 B2 * | 1/2004 | Lang et al. | 227/51 |
| 6,814,531 B2 | 11/2004 | Stevenson et al. | |
| 6,881,004 B2 | 4/2005 | Handke | |
| 2002/0136593 A1 | 9/2002 | Fisher | |
| 2002/0144386 A1 * | 10/2002 | Lang et al. | 29/243.53 |
| 2002/0148089 A1 * | 10/2002 | Frenken | 29/243.53 |
| 2005/0229378 A1 * | 10/2005 | Dietrich et al. | 29/514 |
| 2006/0096075 A1 * | 5/2006 | Robinson et al. | 29/521 |

FOREIGN PATENT DOCUMENTS

| | | | |
|---|---|---|---|
| JP | 9-42355 | | 2/1997 |
| JP | 9-60682 | | 3/1997 |
| JP | 2000356238 A | * | 12/2000 |
| JP | 2001-248677 | | 9/2001 |
| JP | 2001311444 A | * | 11/2001 |
| JP | 2004232789 A | * | 8/2004 |
| JP | 2004353818 A | * | 12/2004 |
| JP | 2005046902 A | * | 2/2005 |
| JP | 2005046903 A | * | 2/2005 |
| JP | 2006102752 A | * | 4/2006 |
| JP | 2009192068 A | * | 8/2009 |

* cited by examiner

US 8,141,227 B2

ASSEMBLY OF SHEET MATERIALS, TUBE ASSEMBLY, DRAWING METHOD AND TOOLS FOR DRAWING

This is a divisional application of Ser. No. 10/721,162, filed Nov. 26, 2003 now abandoned.

BACKGROUND OF THE INVENTION

The present invention relates to an assembly of sheet materials in which a pair of sheets of materials is overlappingly joined, a tube assembly comprising tubular bodies which are overlappingly joined to one another, a drawing method for obtaining the sheet assembly and the tube assembly, and tools used in the drawing method.

An example of the related art is a suspension strut (a piston-cylinder assembly) such as that shown in FIG. 16.

A suspension strut comprises a piston 1, an inner cylinder 2 in which the piston 1 is slidably provided, an outer cylinder (a tube) 3 having one end closed, which accommodates the inner cylinder 2, and a piston rod 4 having one end connected to the piston 1. The other end of the piston rod 4 extends to the outside through a rod guide 5 commonly fitted into the open end portions of the inner cylinder 2 and the tube 3. A hydraulic fluid is sealably contained in the inner cylinder 2. The suspension strut further comprises damping force generating means (not shown) provided in the piston 1 and a base valve 6 attached to a lower end of the inner cylinder 2. The hydraulic fluid sealably contained in the inner cylinder 2 is flowed through the damping force generating means and the base valve 6, to thereby generate a damping force during extension and compression strokes. A gas and the hydraulic fluid are sealably contained in a reservoir 7 provided between the inner cylinder 2 and the tube 3, so as to compensate for a hydraulic fluid in an amount corresponding to the volume of the portion of the piston rod 4 which enters or exits the inner cylinder 2.

In a strut of this type (a dual-tube type hydraulic cylinder), a spring seat 11 is overlappingly joined to the tube 3 at an intermediate position between axially opposite ends of the tube 3, and a knuckle bracket 12 is overlappingly joined to a lower end of the tube 3. The spring seat 11 receives a spring provided between the spring seat 11 and a vehicle body. The knuckle bracket 12 is connected to a knuckle of the vehicle body. Generally, the spring seat 11 and the knuckle bracket 12 (support members) are joined by welding to the outer cylinder 3 (the tube), at an end of the overlapping part of the tube 3 and each of the support members 11 and 12 in a circumferential direction, as indicated by weld joints 8. In a joint of this type, however, the tube 3 is undesirably deformed due to heat produced during the welding process, resulting in poor dimensional accuracy. Further, a welding operation is time-consuming. In addition, oxide scales are formed on an inner surface of the tube 3 due to heat produced during the welding process, and particles of dust are spread into the air during welding. These oxide scales or particles of dust contaminate the hydraulic fluid. Thus, a weld joint is disadvantageous in terms of dimensional accuracy, productivity and durability.

Unexamined Japanese Patent Application Public Disclosure (Kokai) No. 09-060682 discloses a joining method in which an overlapping part of a knuckle bracket (a first tubular body) and a tube (a second tubular body) is pressed radially inwardly at a plurality of positions under electric resistance heating, thereby forming joint portions as spot-like recesses. By this joining method, the above-mentioned disadvantages of a weld joint can be avoided.

As a drawing method for joining two sheets of materials, U.S. Pat. No. 4,831,704 discloses a method in which an outer wall portion of a drawn portion of one sheet located rearward relative to a direction of drawing is laterally extruded into a drawn portion of the other sheet located forward relative to the direction of drawing. However, there is no case in which this drawing method is applied to the joining of tubular bodies.

The above-mentioned prior art techniques are disadvantageous for the following reasons.

The joint portion of Kokai No. 09-060682 has a cup-like shape in which a convexly curved surface of the first tubular body (knuckle bracket) and a concavely curved surface of the second tubular body (outer cylinder) simply make contact with each other to form a cup-like joint. This results in poor peeling resistance. Therefore, when a large peeling force acts on the first tubular body, the first tubular body is readily peeled from the second tubular body.

In the drawing method of U.S. Pat. No. 4,831,704, a joint portion having a laterally extruded shape is obtained, enabling high peeling resistance. Therefore, if this drawing method is applied to the joining of tubular bodies, the above-mentioned problem of low peeling resistance is solved. However, the method of U.S. Pat. No. 4,831,704 involves reduction of a thickness of the sheet due to plastic flow of material. Therefore, if the method of U.S. Pat. No. 4,831,704 is simply applied to the joining of tubular bodies, a lowering of shear strength cannot be avoided. Therefore, the method of U.S. Pat. No. 4,831,704 cannot be applied to a member subject to a large shearing force, such as a strut.

SUMMARY OF THE INVENTION

The present invention has been made with a view to solving the above problems. It is an object of the present invention to provide an assembly of sheet materials and a tube assembly which have both high peeling resistance and high shear strength. It is another object of the present invention to provide a drawing method and tools therefor which enable the tube assembly to be readily and reliably obtained.

The present invention provides an assembly of sheet materials in which a first sheet of material and a second sheet of material are disposed in an overlapping relationship, with a plurality of joint portions being formed therebetween by drawing an overlapping part of the first and second sheets of materials at a plurality of positions, wherein the plurality of joint portions includes at least one first joint portion in which the first sheet of material is laterally extruded into the second sheet of material and at least one second joint portion in which the first sheet of material and the second sheet of material are in contact with each other in a cup-like surface configuration.

The present invention also provides a tube assembly comprising a first tubular body and a second tubular body disposed such that walls of the first and second tubular bodies overlap, a plurality of joint portions being formed between the first and second tubular bodies by drawing an overlapping part of the walls of the first and second tubular bodies at a plurality of positions, wherein the plurality of joint portions includes at least one first joint portion in which the wall of the first tubular body is laterally extruded into the wall of the second tubular body and at least one second joint portion in which the walls of the first tubular body and the second tubular body are in contact with each other in a cup-like surface configuration.

In an assembly of sheet materials and a tube assembly according to the present invention, both a joint portion having a laterally extruded shape, which is excellent in peeling resistance, and a second joint portion having a cup-like shape, which is excellent in shear strength, are formed in the overlapping part of the sheets or the walls of the tubular bodies. Therefore, an assembly of sheet materials and a tube assembly of the present invention are capable of withstanding both a large peeling force and a large shearing force.

In the tube assembly of the present invention, the types of the tubular bodies are not particularly limited. However, the first tubular body may be a support member, such as a spring seat or a knuckle bracket, with the second tubular body being a tube for a suspension cylinder.

In this case, the tubular body may not necessarily have a circumferentially closed cross-section. The tubular body may be partially cut away in a circumferential direction so as to form a C-shaped cross-section.

The present invention further provides a tube assembly comprising a dual tube including a first tubular body located on a radially outer side and a second tubular body located on a radially inner side, with a plurality of joint portions being formed therebetween by drawing an overlapping part of walls of the first and second tubular bodies at a plurality of positions in a radially inward direction, a third tubular body being provided within the dual tube, wherein the plurality of joint portions includes at least one first joint portion in which the wall of the first tubular body is laterally extruded into the wall of the second tubular body and at least one second joint portion in which the walls of the first and second tubular bodies are in contact with each other in a cup-like surface configuration, and the second joint portion is formed on a side from which the third tubular body is inserted into the dual tube.

In this tube assembly, the third tubular body can be smoothly inserted into the dual tube by using the gently curved second joint portion as a guide.

In this tube assembly, the third tubular body may be tangent to the second joint portion of the dual tube. In this case, the third tubular body can be smoothly inserted into the dual tube by using the second joint portion as a guide. Further, the third tubular body can be automatically centered with respect to the dual tube.

In this tube assembly, the types of the tubular bodies are not particularly limited. However, the first tubular body may be a support member, such as a spring seat or a knuckle bracket, with the second tubular body being a tube for a suspension cylinder. In this case, the suspension cylinder may be a dual-tube type hydraulic cylinder, wherein the second tubular body is an outer cylinder of the hydraulic cylinder and the third tubular body is an inner cylinder of the hydraulic cylinder.

The present invention further provides a drawing method for forming the above-mentioned tube assembly, comprising the steps of:

providing two tubular bodies, one of which is fittingly disposed in the other to thereby overlap walls of the two tubular bodies;

positioning tools for drawing an overlapping part of the walls of the two tubular bodies, the tools being arranged circumferentially along the overlapping part while being diametrically opposed to each other; and drawing the overlapping part simultaneously at a plurality of positions by means of the tools, which positions are arranged in an equally angularly spaced relationship.

In this drawing method, the overlapping part is simultaneously drawn by tools at a plurality of positions, which are arranged in an equally angularly spaced relationship. Therefore, a forming pressure can be efficiently applied to the overlapping part.

The present invention further provides a set of tools used in the above-mentioned drawing method, including punches and dies, the punches being provided around the overlapping part of the walls of the two tubular bodies in an equally angularly spaced relationship, while being diametrically opposed to each other, the dies being provided inside the overlapping part, each die cooperating with a corresponding punch to thereby draw the overlapping part, the dies being supported by a hollow mandrel for insertion into the overlapping part in a state such that the dies are capable of radially reciprocal movement, the hollow mandrel accommodating a working rod wedged behind each die, the working rod being axially movable so as to cause radially reciprocal movement of each die.

By means of this set of tools, positioning of the die at a working position can be readily and reliably conducted in a narrow space within the tubular body by axially moving the working rod.

Each of FIGS. 2(A) and (B) is a perspective view of an essential part of a strut as a tube assembly according to an embodiment of the present invention, indicating an overlapping joint between the strut and a knuckle bracket.

Figure 3:
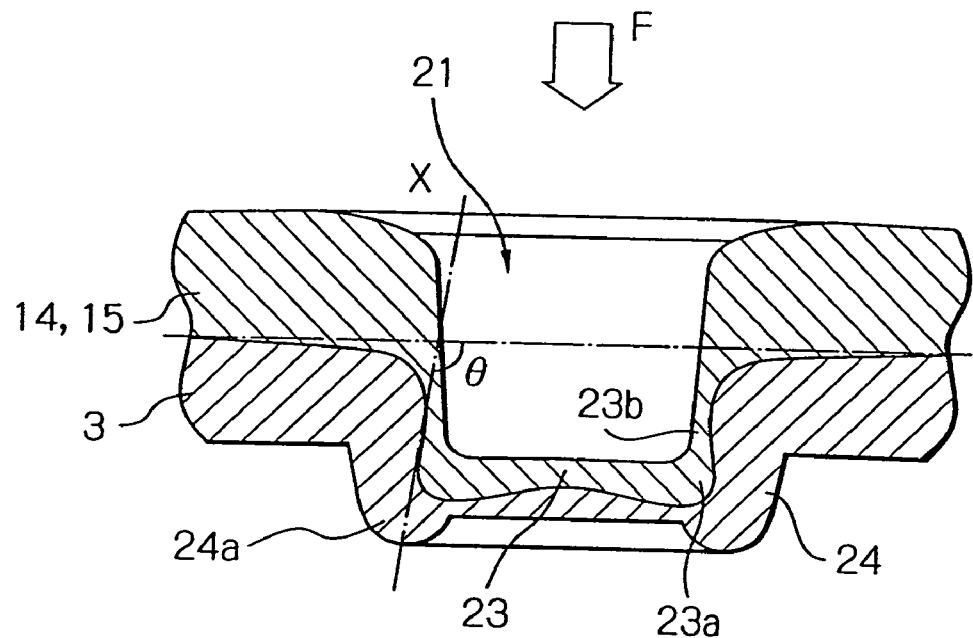

FIG. 3 is a cross-sectional view showing an example of a joint portion having a laterally extruded shape, which is formed by drawing.

Figure 4:
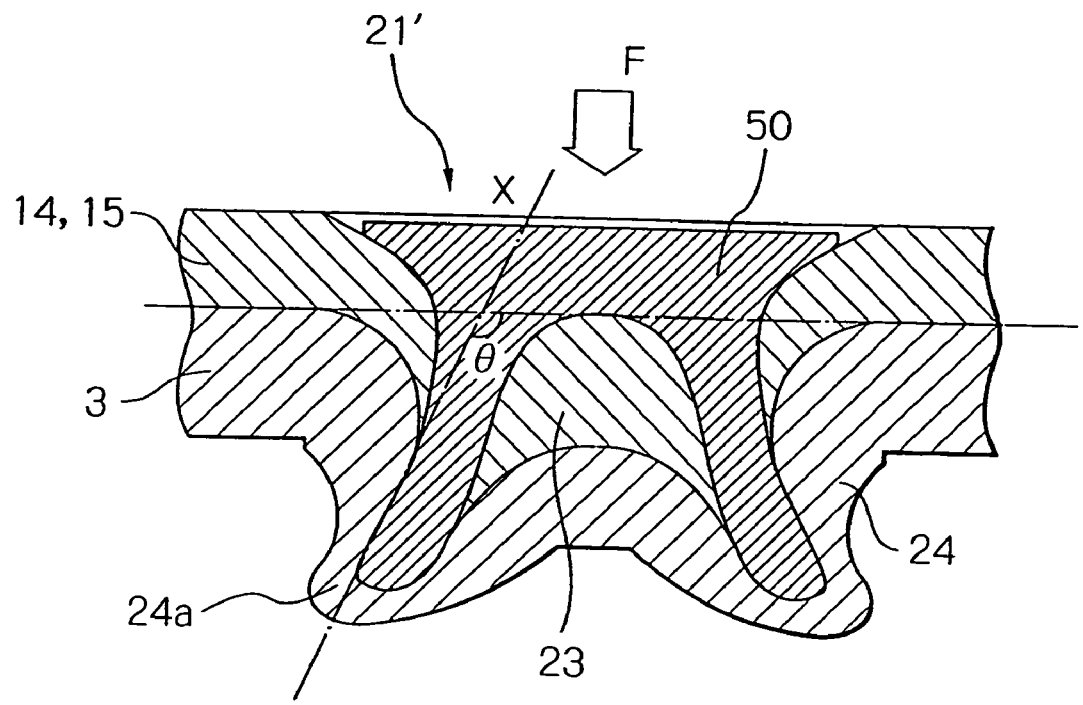

FIG. 4 is a cross-sectional view showing another example of a joint portion having a laterally extruded shape, which is formed by drawing.

Figure 5:
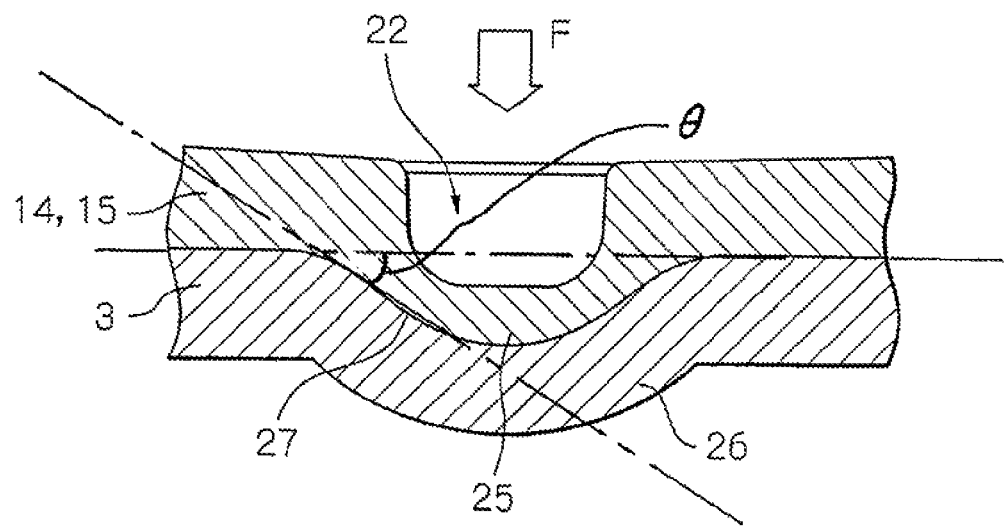

FIG. 5 is a cross-sectional view showing a joint portion having a cup-like shape, which is formed by drawing.

Figure 6:
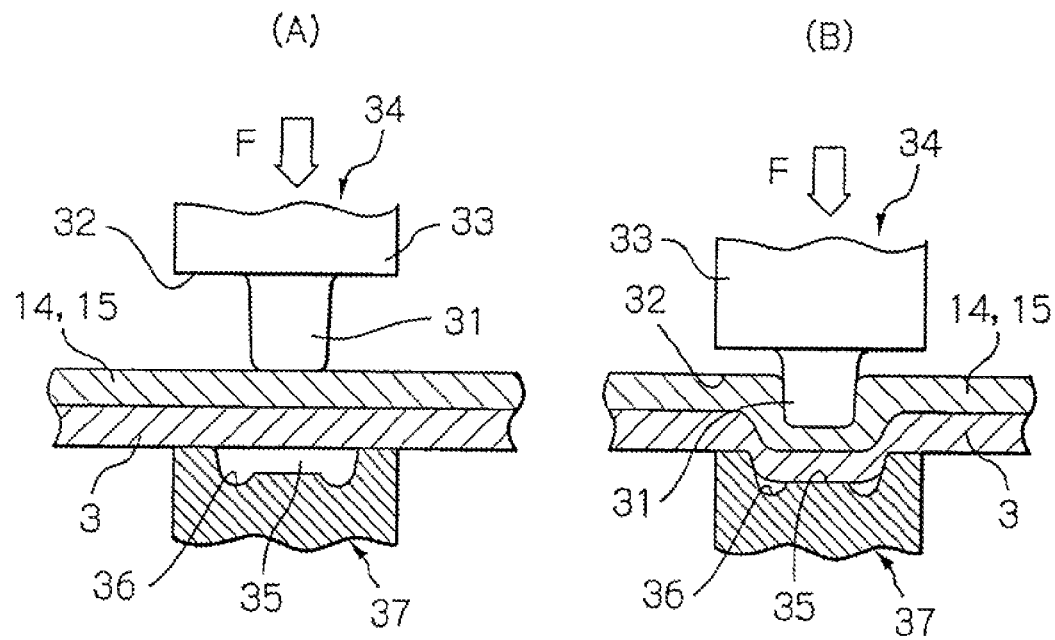

FIGS. 6(A) and 6(B) are cross-sectional views explaining steps carried out in a drawing method for forming the joint portion shown in FIG. 3.

Figure 7:
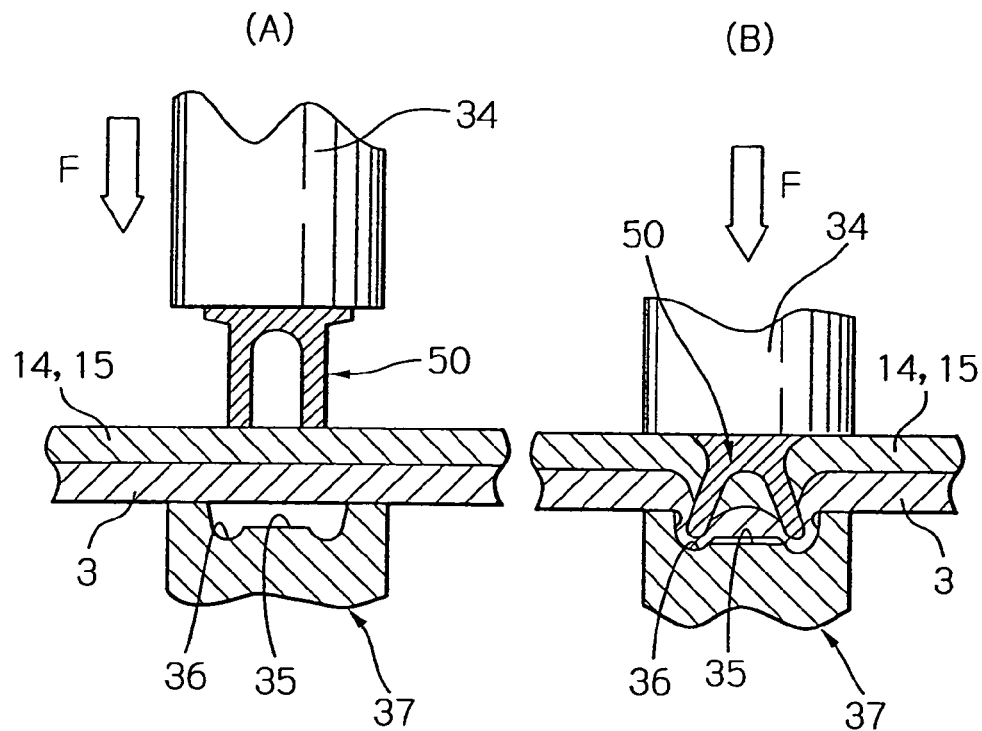

FIGS. 7(A) and 7(B) are cross-sectional views explaining steps carried out in a drawing method for forming the joint portion shown in FIG. 4.

Figure 8:
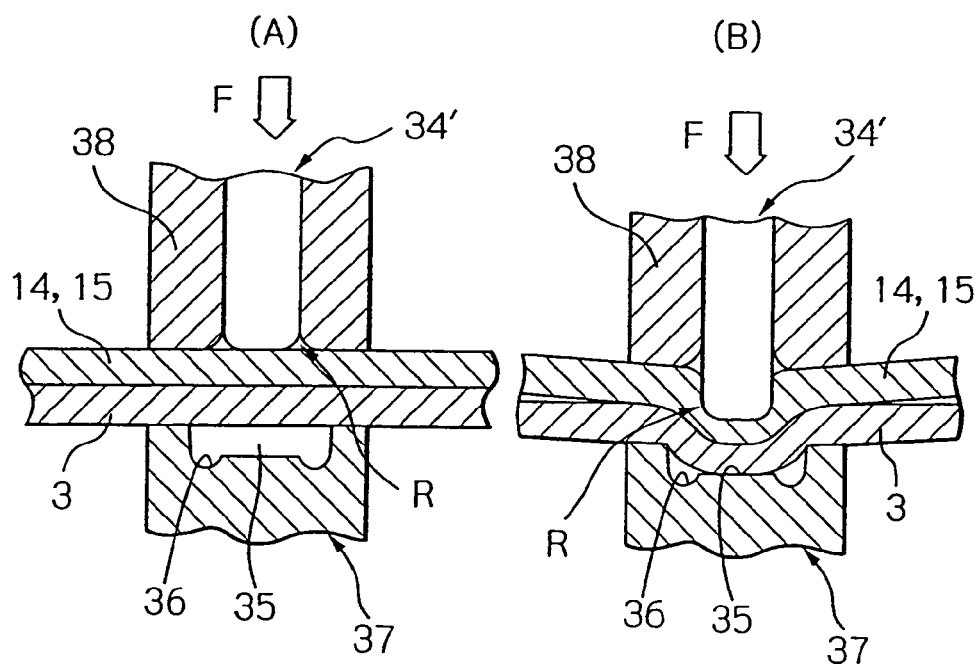

FIGS. 8(A) and 8(B) are cross-sectional views explaining steps carried out in a drawing method for forming the joint portion having the cup-like shape.

Figure 9:
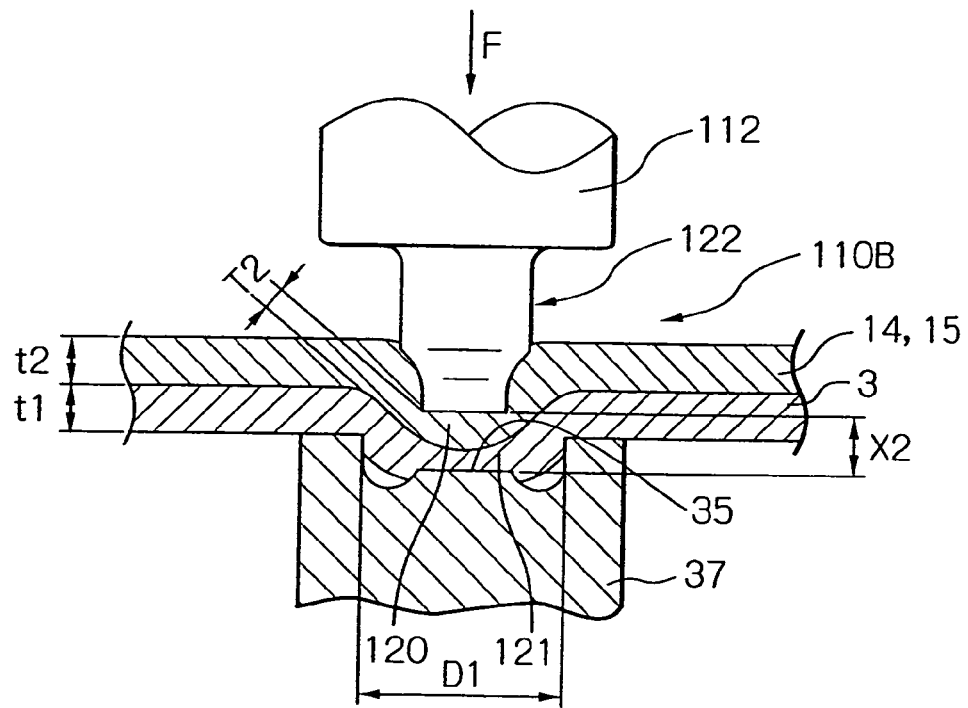

FIG. 9 is a vertical cross-sectional view of drawn portions of a tube and a knuckle bracket, which are in contact with each other in a cup-like surface configuration.

Figure 10:
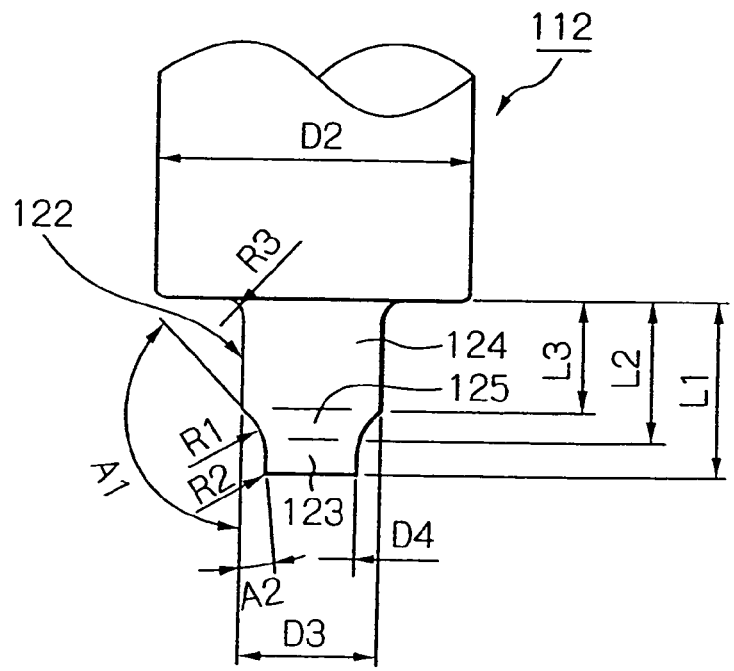

FIG. 10 is a side view of a punch used for forming the joint portion shown in FIG. 9 by drawing.

Figure 11:
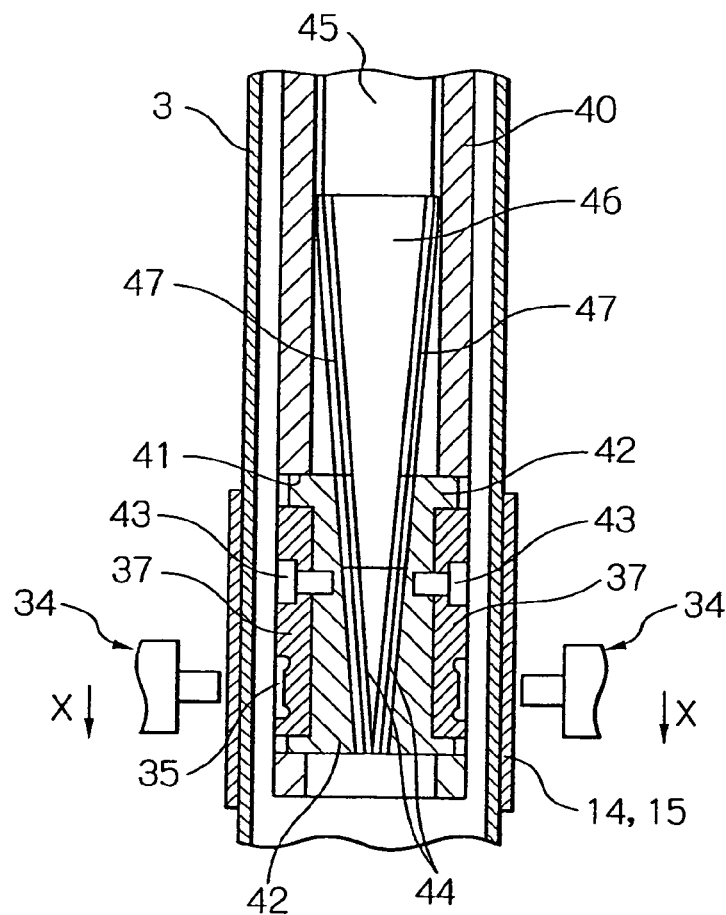

FIG. 11 is a cross-sectional view indicating tools for drawing and how the tools are used.

Figure 12:
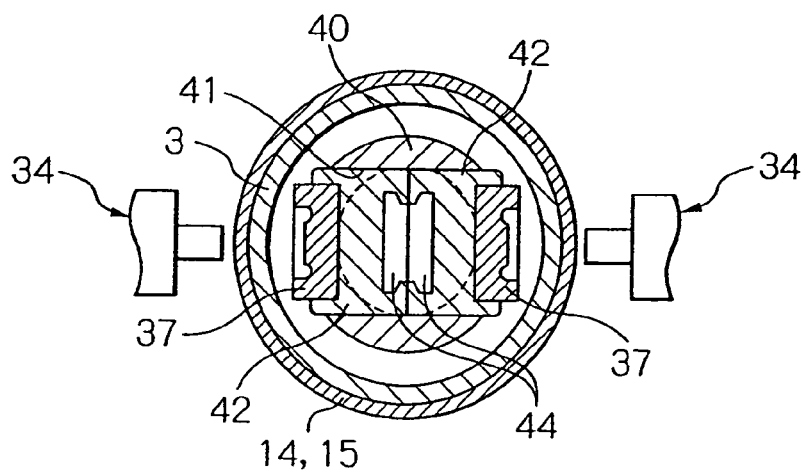

FIG. 12 is a cross-sectional view, taken along the line X-X in FIG. 9.

Figure 13:
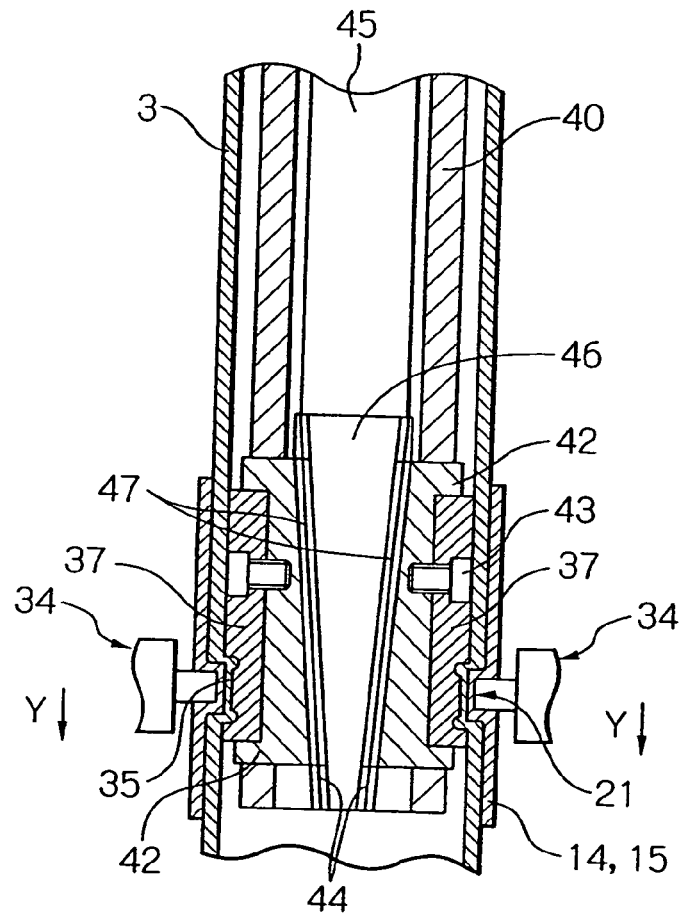

FIG. 13 is a cross-sectional view indicating tools for drawing and how the tools are used.

Figure 14:
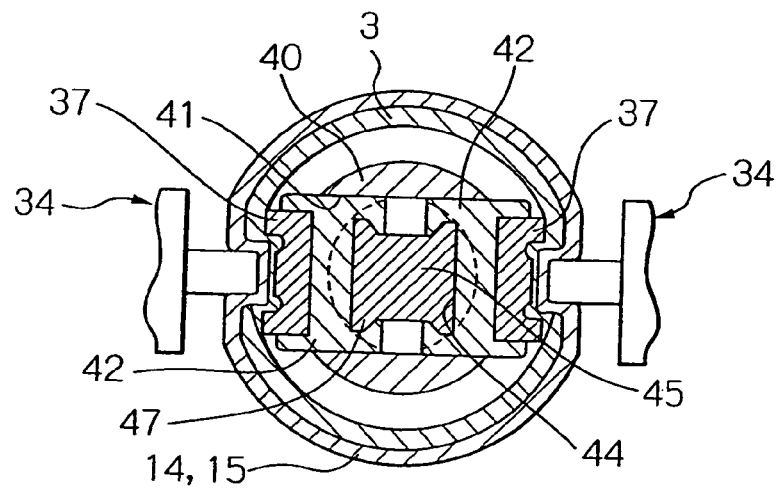

FIG. 14 is a cross-sectional view, taken along the line Y-Y in FIG. 13.

Figure 15:
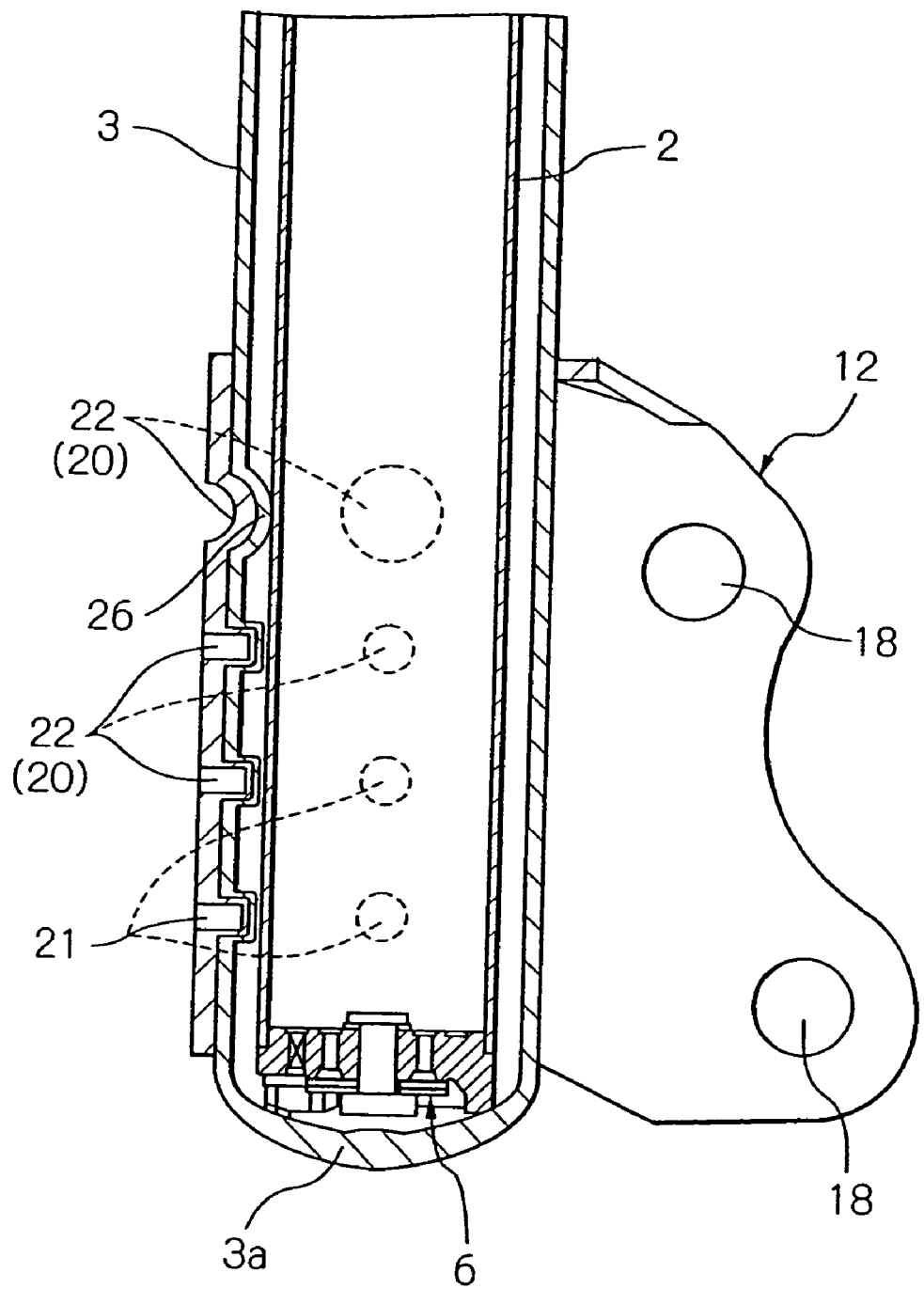

FIG. 15 is a cross-sectional view of a strut according to an embodiment of the present invention.

Figure 16:
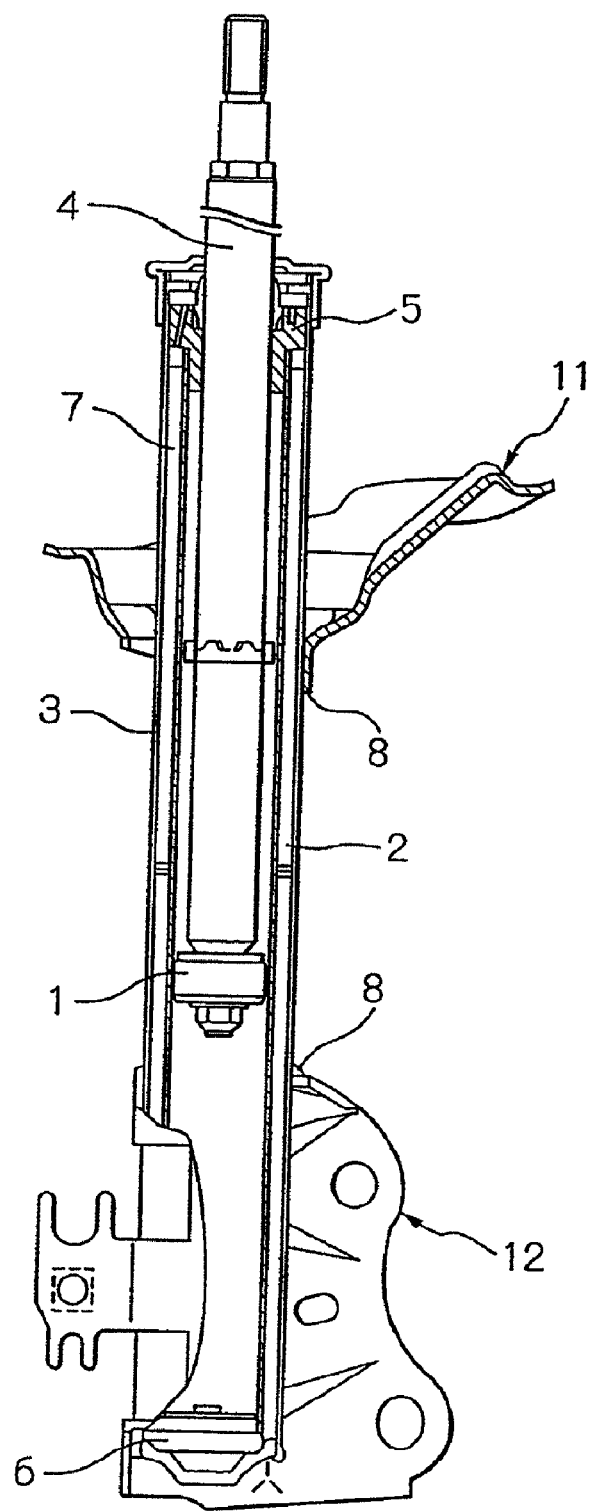

FIG. 16 is a cross-sectional view showing a general construction of a strut to which an embodiment of the present invention is applied.

DETAILED DESCRIPTION OF THE INVENTION

Hereinbelow, embodiments of the present invention are described in detail, referring to the accompanying drawings.

Figure 1:
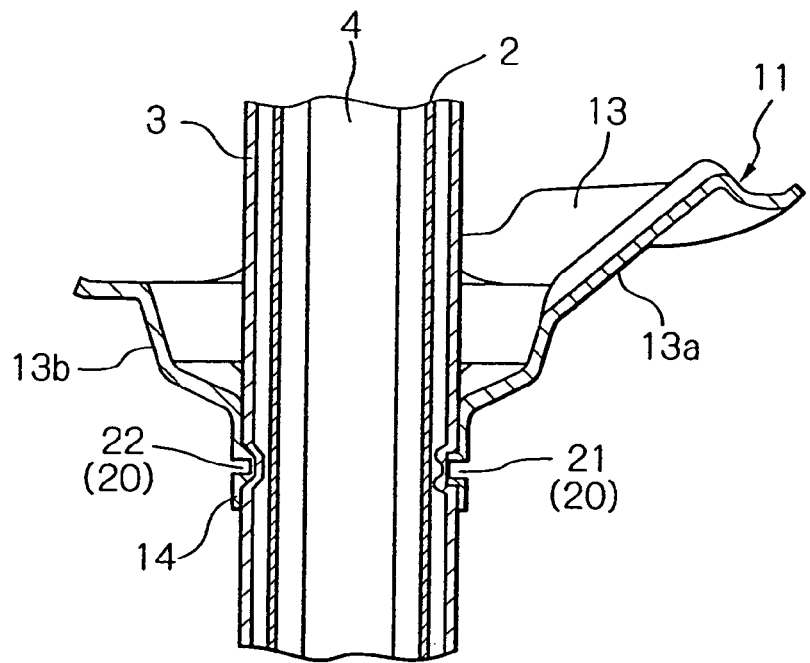
FIG. 1 is a cross-sectional view of an essential part of a strut as a tube assembly according to an embodiment of the present invention, indicating an overlapping joint between the strut and a spring seat.
Figure 2:
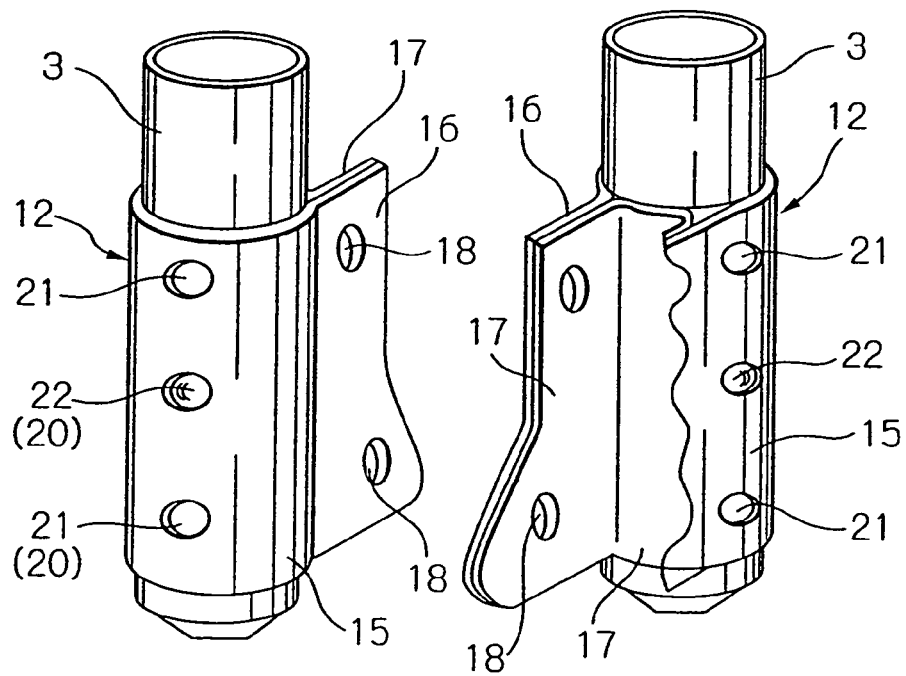

FIGS. 1 and 2 show a structure of an essential part of a suspension strut (a dual-tube type hydraulic cylinder) as a tube assembly according to an embodiment of the present invention. A general construction of this strut is substantially the same as that of the strut shown in FIG. 16, and therefore the same reference numerals are used to indicate identical parts, with overlapping explanations being omitted.

In this embodiment, a spring seat 11 (a support member) for receiving a spring provided between the spring seat 11 and a vehicle body and a knuckle bracket 12 (a support member) to be connected to a knuckle of the vehicle body are joined to an outer cylinder (a tube) 3 in an overlapping relationship, with a plurality of joint portions 20 being formed therebetween. The joint portions 20 are formed by drawing in a manner described later. More specifically, the spring seat 11 comprises a flange portion 13 for receiving a spring and a cylindrical portion 14 provided at an eccentric position in the flange portion 13. The cylindrical portion 14 is joined to the tube 3 in an overlapping relationship through the joint portions 20. The knuckle bracket 12 comprises a body portion 15 having a C-shaped cross-section, sheet-like connecting portions 16 integrally formed with the body portion 15, and a reinforcing frame 17 covering an opening of the body portion 15 and integrally connected to the connecting portions 16. The body portion 15 is joined to the tube 3 in an overlapping relationship through the joint portions 20. Each connecting portion 16 of the knuckle bracket 12 includes two vertically arranged mounting holes 18 for connection to the knuckle of the vehicle body.

In this embodiment, the joint portions 20 are formed as recesses by drawing an overlapping part of walls of two members, namely the tube 3 and the cylindrical portion 14 or the body portion 15, in a radially inward direction. The joint portions 20 include at least one first joint portion 21 as shown in FIG. 3 in which the wall of the cylindrical portion 14 or the body portion 15 is laterally extruded into the wall of the tube 3 and at least one second joint portion 22 as shown in FIG. 5 in which the walls of the tube 3 and the cylindrical portion 14 or the body portion 15 are in contact with each other in a cup-like surface configuration.

Hereinbelow, the first joint portion 21 is more illustratively described, referring to FIG. 3. A drawn portion of the cylindrical portion 14 of the spring seat 11 or the body portion 15 of the knuckle bracket 12 located rearward relative to a direction F of drawing (a first tubular body) is designated by 23. An outer wall portion 23a of the drawn portion 23 is laterally extruded into a drawn portion 24 of the tube 3 located forward relative to the drawing direction F (a second tubular body). That is, the drawn portion 23 of the first tubular body 14 or 15 comprises a laterally extruded outer wall portion 23a located forward relative to the drawing direction F, which is extruded into the drawn portion 24 of the tube 3. The drawn portion 23 further comprises a thin-walled portion 23b located rearward of the laterally extruded outer wall portion 23a. The drawn portion 24 of the tube 3 comprises an annular projection 24a at an outer circumferential edge thereof located forward relative to the drawing direction F. In the first joint portion 21 in which the outer wall portion 23a of the drawn portion 23 of the first tubular body 14 or 15 is laterally extruded into the drawn portion 24 of the tube 3, sufficiently high peeling resistance can be obtained. However, due to the presence of the thin-walled portion 23b of the drawn portion 23 of the first tubular body 14 or 15, shear strength is relatively low.

The laterally extruded shape of the first joint portion may be such as that indicated in FIG. 4. The laterally extruded shape of a first joint portion 21' of FIG. 4 is formed by the rivet 50, which is extruded into both the cylindrical portion 14 of the spring seat 11 or the body portion 15 of the knuckle bracket 12 located rearward relative to the drawing direction F and the tube 3 located forward relative to the drawing direction F. In the first joint portion 21', the first tubular body 14 or 15 is drawn radially inwardly into the tube 3 side through the rivet 50, and the rivet 50 is laterally extruded into the drawn portion 24 of the tube 3. Therefore, sufficiently high peeling resistance can be obtained. In addition, due to the lateral extrusion of the rivet 50, shear strength is higher than that of the first joint portion 21 of FIG. 3.

The "laterally extruded shape" of the first joint portion in this embodiment is defined as a shape such that, as indicated in FIGS. 3 and 4, a part of a side wall inner surface of the recess of a member located forward in the drawing direction (the tube 3) is inclined so that an angle θ of a tangent X thereto (relative to a horizontal line in FIGS. 3 and 4) is larger than 90 degrees, and that this inclined part of the side wall inner surface of the recess makes contact with at least a part of a member located rearward in the drawing direction (the tubular body 14 or 15, and the rivet 50).

That is, when the recess of the first joint portion is in a circular form, a part of the side wall inner surface of the recess of the member located forward relative to the drawing direction (the tube 3) is diametrically enlarged, and the member located rearward relative to the drawing direction (the tubular body 14 or 15, and the rivet 50) is extruded into the diametrically enlarged portion of the recess. By this arrangement, when a force acting in a direction for peeling (in an upward direction in FIGS. 3 and 4) is applied to the member located rearward relative to the drawing direction (the tubular body 14 or 15, and the rivet 50), this member engages the inclined part of the side wall inner surface of the recess of the tube 3, thus ensuring high peeling resistance.

On the other hand, as clearly shown in FIG. 5, the second joint portion 22 has a simple cup-like shape. That is, a drawn portion 25 of the cylindrical portion 14 of the spring seat 11 or the body portion 15 of the knuckle bracket 12 as the first tubular body and a drawn portion 26 of the tube 3 as the second tubular body are in contact with each other in a cup-like surface configuration 27. In this case, the drawn portion 25 of the first tubular body 14 or 15 and the drawn portion 26 of the tube 3 are both imparted with sufficiently large wall-thicknesses, and therefore sufficiently high shear strength can be obtained. However, in the second joint portion 22, the drawn portion 25 and the drawn portion 26 simply make contact with each other in the cup-like surface configuration 27. Therefore, peeling resistance is substantially nil.

The "cup-like shape" of the second joint portion in the present invention is defined as a shape such that the angle θ of the tangent X to the side wall inner surface of the recess of the member located forward relative to the drawing direction (the tube 3) is 90 degrees or less (relative to a horizontal line in FIG. 3).

In this embodiment, the first joint portion 21 (21') is selectively disposed at a position at which peeling resistance is most desirable, while the second joint portion 22 is selectively disposed at a position at which shear strength is most desirable.

Specifically, as shown in FIG. 1, in the overlapping part of the cylindrical portion 14 of the spring seat 11 and the tube 3, the first joint portion 21 is formed at a position facing an eccentrically extended portion 13a of the flange portion 13 while the second joint portion 22 is formed at a position facing an eccentrically narrow portion 13b of the flange portion 13. In the overlapping part of the body portion 15 of the knuckle bracket 12 and the tube 3, as shown in FIG. 2, the first joint portions 21 are formed on axially opposite ends, and the second joint portion 22 is formed at an intermediate position between the first joint portions 21.

In a strut of this type, when a spring (not shown) is received in the flange portion 13 of the spring seat 11, a moment which acts on the eccentrically extended portion 13a is higher than a moment which acts on the eccentrically narrow portion 13b. Therefore, in the cylindrical portion 14 of the spring seat 11, a large peeling force acts on an upper end of the portion facing the eccentrically extended portion 13a. In this embodiment of the present invention, the overlapping portion of the cylindrical portion 14 includes the first joint portion 21 having a laterally extruded shape formed at the position facing the eccentrically extended portion 13a. Therefore, the cylindrical portion 14 of the spring seat 11 as the first tubular body is not peeled from the tube 3, thus maintaining a firm joint. In addition, the second joint portion 22 having a cup-like shape is also formed in the overlapping part including the cylindrical portion 14, so that the spring seat 11 as a whole, including the cylindrical portion 14, is capable of withstanding a large shearing force.

In the knuckle bracket 12, a line connecting the two vertically arranged mounting holes 18 is inclined relative to the axis of the strut. Therefore, during rolling of the vehicle body, a large peeling force acts on upper and lower ends of the body portion 15 of the knuckle bracket 12. In this embodiment of the present invention, the first joint portions 21 having a laterally extruded shape are formed on upper and lower ends of the overlapping part including the body portion 15. Therefore, the body portion 15 of the knuckle bracket 12, as the first tubular body, is not peeled from the tube 3, and a firm joint is maintained. In addition, the second joint portion 22 having a cup-like shape is formed at an intermediate position in the overlapping part including the body portion 15. Therefore, the knuckle bracket 12 as a whole, including the body portion 15, is capable of withstanding a large shearing force. It should be noted that with respect to the overlapping part of the body portion 15 of the knuckle bracket 12 and the tube 3, the positions of the first joint portion 21 and the second joint portion 22 are not limited to those in this embodiment, as long as the first joint portion 21 is disposed at a position at which peeling resistance is most desirable and the second joint portion 22 is disposed at a position at which shear strength is most desirable. For example, the second joint portion 22 may be disposed at an axially upper position and an intermediate position in the overlapping part, with the first joint portion 21 being disposed at an axially lower position. By forming the first joint portion 21 and the second joint portion 22 at optimum positions, the reinforcing frame 17 can be eliminated.

FIGS. 6(A), 6(B), 7(A) and 7(B) indicate drawing methods for forming the first joint portions 21 and 21' having a laterally extruded shape.

For forming the first joint portion 21, as shown in FIGS. 6(A) and 6(B), a punch 34 and a die 37 are provided. The punch 34 comprises a press portion 31 having a small diameter and a substantially flat distal end face, and a body portion 33 having a large diameter and connected to the press portion 31 through a shoulder portion 32. The die 37 includes a die cavity 35 formed in an upper surface thereof and an annular groove 36 formed in a circumferential edge of a bottom surface of the die cavity 35. For drawing, as indicated in FIG. 6(A), first, the die 37 is abutted against an inner surface of the tube 3 and held in position. In this state, the punch 34 is moved in a direction F of drawing. Consequently, as indicated in FIG. 6(B), the cylindrical portion 14 of the spring seat 11, or the body portion 15 of the knuckle bracket 12 as the first tubular body, and the tube 3 as the second tubular body, are partially drawn into the die cavity 35 of the die 37. The drawn portions maintain a cup-like joint configuration until the inner surface of the tube 3 reaches the bottom surface of the die cavity 35 of the die 37. Thereafter, according to a further movement of the punch 34 in the drawing direction F, the drawn portions are laterally enlarged in the die cavity 35. Finally, plastic flow of the material of the drawn portions fills the die cavity 35 including the annular groove 36. As indicated in FIG. 3, the outer wall portion of the drawn portion 23 of the first tubular body 14 or 15 is laterally extruded into the drawn portion 24 of the tube 3, thus forming the first joint portion 21.

For forming the first joint portion 21', as shown in FIGS. 7(A) and 7(B), the rivet 50 in the form of a bottomed cylinder is provided. First, as indicated in FIG. 7(A), the die 37 is abutted against the inner surface of the tube 3 and held in position. The rivet 50 is placed on an outer surface of the first tubular body 14 or 15, with an open end of the rivet 50 facing downward. In this state, the punch 34, from which the press portion 31 is eliminated, is moved in the drawing direction F. Consequently, as indicated in FIG. 7(B), the cylindrical portion 14 of the spring seat 11, or the body portion 15 of the knuckle bracket 12, as the first tubular body, and the tube 3, as the second tubular body, are partially drawn, through the rivet 50, into the die cavity 35 of the die 37. Finally, the material of the drawn portions fills the die cavity 35 including the annular groove 36 while the rivet 50 is extruded into both the cylindrical portion 14 or the body portion 15 and the tube 3, thus forming the first joint portion 21'.

FIGS. 8(A) and 8(B) indicate a drawing method for forming the second joint portion 22 having a cup-like shape. For forming the second joint portion 22, as indicated in the drawings, there are provided a shaft type punch 34' having a distal end corner having a relatively large radius (R) of curvature, a cylindrical guide 38 for guiding a sliding movement of the punch 34', and the die 37 of the same type as that described above. The cylindrical guide 38 is supported by a cushion (not shown) and is capable of moving together with the punch 34' when no resisting force is applied to the cylindrical guide 38. For drawing, as indicated in FIG. 8(A), first, the die 37 is abutted against the inner surface of the tube 3 and held in position. In this state, the punch 34' and the cylindrical guide 38 are moved as a unit in the drawing direction F. Then, as indicated in FIG. 8(B), the cylindrical guide 38 stops moving and only the punch 34' continues to move. Therefore, the cylindrical portion 14 of the spring seat 11 or the body portion 15 of the knuckle bracket 12, as the first tubular body, and the tube 3, as the second tubular body, are partly drawn into the die cavity 35 of the die 37. In this drawing method, the movement of the punch 34' is stopped when the drawn portions reach the bottom surface of the die cavity 35 of the die 37, to thereby form the second joint portion 22, in which the drawn portion 23 of the first tubular body 14 or 15 and the drawn portion 24 of the tube 3 are in contact with each other in the cup-like surface configuration 27.

FIGS. 9 and 10 indicate a second joint portion 110B as another example of a joint portion having a cup-like shape. In the second joint portion 110B, shear strength which is higher than that of the second joint portion 22 can be obtained.

As shown in FIG. 9, the second joint portion 110B having a cup-like shape can be formed using the die 37, as in the method for forming the first joint portion 21 having a laterally extruded shape, and a punch 112 having a stepped forward end portion (a second punch) 122.

In the second joint portion 110B, a drawn portion 120 of the cylindrical portion 14 or the body portion 15 located rearward relative to the drawing direction F (the first tubular body) has a convexly curved surface fitted against a concavely curved surface of a drawn portion 121 of the tube 3 located forward relative to the drawing direction F (the second tubular body), to thereby form a cup-like joint. The drawn portion 120 does not include a laterally extruded portion. Further, by using the punch 112 having the stepped forward end portion 122, a minimum wall-thickness T2 of the drawn portion 120 of the first tubular body 14 or 15 can be made sufficiently large. When a combined total wall-thickness X2 of the bottom wall of the drawn portion 120 and the bottom wall of the drawn portion 121 is made larger than a wall-thickness t1 of the tube 3, and smaller than 1.5 times the wall-thickness t1 (t1<X2<1.5·t1), the minimum wall-thickness T2 of the first tubular body 14 or 15 is about 30% of the wall-thickness t1 or more. The second joint portion 110B having a cup-like shape can be formed using the die 37 including the die cavity 35, which is identical to that used for forming the first joint portion 21 having a laterally extruded shape.

In the second joint portion 110B having a cup-like shape, the drawn portion 120 does not include a laterally extruded portion. Therefore, peeling resistance is substantially nil. However, there is no thin-walled portion formed in the drawn portion 120 and therefore the minimum wall-thickness T2 of the drawn portion 120 is sufficiently large. This enables sufficiently high shear strength to be obtained. When an excessive shearing load is applied to the drawn portions 120 and 121 of the second joint portion 110B, the drawn portions 120 and 121 laterally move relative to each other and are separated from each other, without being fractured.

Next, referring to FIG. 10, description is made with regard to the shape of the stepped forward end portion 122 of the punch 112 used for forming the second joint portion 110B having a cup-like shape.

The stepped forward end portion 122 of the punch 112 comprises a taper portion 123 and a cylindrical base portion 124. The taper portion 123 is formed at a distal end of the forward end portion 122 and has a smaller diameter than the cylindrical base portion 124. The cylindrical base portion 124 smoothly merges into the taper portion 123 through a curved surface 125 (having a radius R1 of curvature). By way of example, the dimensions of each portion of the punch 112 are indicated below.

When a diameter D1 of the die cavity 35 of the die 37=10 mm,
    a diameter D2 of the punch 112=14 mm
    a diameter D3 of the base portion 124=6.6 mm
    a diameter of a distal end of the taper portion 123=4.6 mm
    a length L1 of the forward end portion 122=8 mm
    a length L2 between a proximal end of the forward end portion 122 and a proximal end of the taper portion 123=6 mm
    a length L3 of the base portion 124=5 mm
    an angle A1 between a side surface of the base portion 124 and the curved surface 125=135°
    an angle A2 of the taper portion 123=2.9°
    a total thickness X2 of the bottom walls of the drawn portions 120 and 121=2.8 to 3.0 mm By forming the second joint portion 110B having a cup-like shape using the punch 112 having the stepped forward end portion 122, the minimum wall-thickness T2 of the first tubular body 14 or 15 can be made larger than that obtained in the second joint portion 22, which is formed using the punch 34' shown in FIGS. 8(A) and 8(B) including a forward end portion having a uniform diameter. Therefore, shear strength can be increased.

By appropriately combining and positioning the first joint portion 21 (or 21') shown in FIG. 3 (or FIG. 4) having excellent peeling resistance and the second joint portion 110B shown in FIG. 9 having excellent shear strength, the overlapping part of the tube 3 and the first tubular body 14 or 15 can be imparted with both high peeling resistance and high shear strength, to thereby ensure a firm joint between the tube 3 and the first tubular body 14 or 15.

Tools for forming the first joint portion 21 and the second joint portion 22 by the above-mentioned drawing methods are shown in FIGS. 11 to 14, by way of example. In this example, the tools for forming the first joint portion 21 are shown. The punch 34 and the die 37 are identical to those shown in FIGS. 6(A) and 6(B). The cylindrical portion 14 of the spring seat 11, or the body portion 15 of the knuckle bracket 12 as the first tubular body, is illustrated as a simple tubular form.

In this embodiment, a pair of punches 34 and a pair of dies 37 are provided. The punches 34 of this pair are provided around the overlapping part of the tube 3, as the second tubular body, and the first tubular body 14 or 15 in diametrically opposite positions, i.e., in positions in which the punches 34 face each other in a direction perpendicular to the axis of the overlapping part of the tube 3 and the first tubular body 14 or 15. By means of a drive means (not shown), the punches 34 are radially reciprocally moved synchronically with each other. The dies 37 are supported by a hollow mandrel 40 for insertion into the tube 3, in a state such that the dies 37 are capable of radially reciprocal movement.

Illustratively stated, the dies 37 are individually fixed to front surfaces of two retainers 42 by means of bolts 43. The retainers 42 are slidably fitted into a guide hole 41 which radially extends through a distal end portion of the hollow mandrel 40. A tapered dovetail groove 44 is formed in a rear surface of each retainer 42. Dovetails 47 are fitted into the dovetail grooves 44 of the retainers 42. The dovetails 47 are formed at a distal end taper portion 46 of a working rod 45, which is inserted into the hollow mandrel 40 and linearly moved by a drive means (not shown). That is, the retainers 42 and the working rod 45 are connected through wedging engagement between the dovetail grooves 44 and the dovetails 47. By this arrangement, the two retainers 42 are moved toward and away from each other in a radial direction according to linear movement of the working rod 45, so as to move the dies 37 between retracted positions shown in FIGS. 11 and 12 and working positions shown in FIGS. 13 and 14.

In operation, as indicated in FIGS. 11 and 12, first, the cylindrical portion 14 of the spring seat 11 or the body portion 15 of the knuckle bracket 12 (the first tubular body) is fitted over the tube 3 (the second tubular body), and the overlapping part of the first tubular body 14 or 15, and the tube 3, is positioned relative to the pair of punches 34 provided in a forming apparatus. Subsequently, the hollow mandrel 40 is inserted into the tube 3. The dies 37, each of which is retained by the retainer 42 at the distal end portion of the hollow mandrel 40, are positioned so as to face the punches 34.

Thereafter, as indicated in FIGS. 13 and 14, the working rod 45 is moved downward by means of the drive means (not shown). Then, the retainers 42, which are connected to the working rod 45 through wedging engagement between the dovetails 47 and the dovetail grooves 44, are moved away from each other in a radially outward direction until the dies 37 fixed to the retainers 42 abut against the inner surface of the tube 3. Thereafter, by means of the drive means (not shown), the punches 34 are moved toward each other. Consequently, the overlapping part of the first tubular body 14 or 15, and the tube 3 as the second tubular body, is gradually drawn locally into the die cavity 35 of the die 37 corresponding to each punch 34. The drawing action proceeds in a manner described above in connection with FIGS. 6(A) and 6(B). Consequently, the first joint portions 21 having a laterally extruded shape are simultaneously formed at two diametrically opposite positions in the overlapping part. Thus, the overlapping part is drawn simultaneously at two diametrically opposite positions, so that a forming pressure can be efficiently applied to the overlapping part and that a forming load can be reduced.

After drawing, the punches 34 are retracted by means of the drive means (not shown) and the working rod 45 is moved upward. When the working rod 45 is moved upward, the retainers 42, which are connected to the working rod 45 through the wedging engagement between the dovetails 47 and the dovetail grooves 44, are retracted. Consequently, the dies 37 are moved, together with the retainers 42, and return to the retracted positions shown in FIGS. 11 and 12.

In this embodiment, the punches 34 and the dies 37 are disposed at two diametrically opposite positions. However, this does not limit the present invention. The punches 34 and the dies 37 may be positioned in an equally angularly spaced relationship. For example, the punches 34 and the dies 37 may be provided at three positions at 120° intervals, or five positions at 72° intervals. The purpose of this arrangement is to ensure that force acts uniformly on the working rod 45. By this arrangement, durability of the working rod 45 can be markedly improved.

Further, in this embodiment, the joint portions 20 (21, 22) are formed as recesses by drawing the tubular bodies in a radially inward direction. However, the direction of drawing can be arbitrarily determined. The joint portions 20 (21, 22) may be formed as projections by drawing the tubular bodies in a radially outward direction. In this case, the positional relationship between the punches 34 and the dies 37 is reversed, and the punches 34 are attached to the retainers 42 supported by the hollow mandrel 40.

In the above embodiments, drawing is conducted in order to join the spring seat 11 and the knuckle bracket 12 to the tube (outer cylinder) 3, which forms a strut as a piston-cylinder assembly. However, various parts or members can be drawn according to the present invention. The present invention can be applied to a joint between a spring seat and a shock absorber, an air piston and an air suspension apparatus, or other tubular members of various apparatuses.

In the above embodiments, the first joint portion 21 having a laterally extruded shape and the second joint portion 22 having a cup-like shape are provided at predetermined positions in the overlapping part. Clearly, the positions of the first joint portion 21 and the second joint portion 22 may be different from those shown in the above embodiments, depending on the parts or members to be joined.

In the above embodiments, the present invention is applied to the joining of tubular bodies. However, the present invention can be also applied to the joining of flat sheets or curved sheets. In this case, the same effects as those of the above embodiments can be obtained.

In a suspension strut (a piston-cylinder assembly), as shown in FIG. 15, an inner cylinder (a third tubular body) 2 as a sub-assembly obtained by assembling a piston 1, a piston rod 4, a base valve 6, etc., is provided in the outer cylinder (tube) 3 having one end closed as the second tubular body. To form this strut, the inner cylinder 2 as a sub-assembly is inserted into the outer cylinder 3 from an open end thereof, and the base valve 6 attached to a lower end of the inner cylinder 2 is rested on a seat formed at the bottom portion of the outer cylinder 3 (which bottom portion is generally formed by a base cap produced separately from the outer cylinder 3), followed by assembling a rod guide 5 to the inner and outer cylinders 2 and 3 so as to position the inner cylinder 2 concentrically with respect to the outer cylinder 3.

Therefore, when the joint portions 20 (21, 22) are formed by drawing the outer cylinder 3 and the cylindrical portion 14 or the body portion 15 in a radially inward direction as shown in FIGS. 1 and 2, the drawn portions 23 and 24 of the first joint portion 21 or the drawn portions 25 and 26 of the second joint portion 22 may interfere with the insertion of the inner cylinder 2 into the outer cylinder 3. Especially, there is a high possibility that the insertion of the inner cylinder 2 will be prevented by the drawn portions 23 and 24, or 25 and 26 formed in the overlapping part (a dual tube) of the knuckle bracket 12 and the outer cylinder 3 in the vicinity of the bottom portion of the outer cylinder 3.

FIG. 15 shows an embodiment which can overcome this disadvantage. In this embodiment, in the overlapping part of the outer cylinder 3 and the knuckle bracket 12, the uppermost joint portion 20 located on a side of the open end of the outer cylinder 3 from which the inner cylinder 2 is inserted is formed as the second joint portion 22. The remaining joint portions 20 at the positions lower than the uppermost joint portion 20 are formed as the first joint portions 21. The second joint portion 22 has a cup-like shape as described above, and the drawn portion 26 of the outer cylinder 3 is relatively gently curved. Therefore, when the inner cylinder 2 is inserted into the outer cylinder 3, the gently curved drawn portion 26 serves as a guide, to thereby enable smooth insertion of the inner cylinder 2 into the outer cylinder 3. In this case, although the second joint portion 22 has low peeling resistance, the first joint portions 21 having high peeling resistance are axially arranged at a number of positions with small spaced intervals as shown in FIG. 15. Therefore, a firm joint can be ensured against the action of a large peeling force.

In producing a suspension strut of this type, various attempts have been made to form a bottom portion 3a (FIG. 15) integrally with the outer cylinder 3 by spinning an end portion of a tubular workpiece, in order to prevent entry of foreign matter or deterioration of a working environment due to welding of the above-mentioned base cap. In these attempts, it is difficult to form, inside the bottom portion 3a of the outer cylinder 3, a seat on which the base valve 6 is rested. Therefore, such a seat for the base valve 6 is likely to be omitted. However, this seat for the base valve 6 is necessary for centering the inner cylinder 2 with respect to the outer cylinder 3. If the seat is omitted, centering of the inner cylinder 2 becomes difficult.

In the embodiment of FIG. 15, the second joint portion 22, in which the drawn portion 26 is gently curved, is disposed at the uppermost position on a side of the open end of the outer cylinder 3. Therefore, the inner cylinder 2 can be accurately centered with respect to the outer cylinder 3 by maintaining the inner cylinder 2 tangent to the drawn portion 26 of the second joint portion 22, as shown in FIG. 15.

The second joint portion 22 may be utilized simply as a means for guiding insertion of the inner cylinder 2. In this case, the inner cylinder 2 may not necessarily be tangent to the second joint portion 22. A gap may be formed between the inner cylinder 2 and the second joint portion 22.

If only the first joint portion 21 having a laterally extruded shape can be formed at the uppermost position due to limitation in terms of designing or manufacturing, the inner cylinder 2 should be inserted into the outer cylinder 3 using an appropriate tool for insertion, which fills a gap between the outer cylinder 3 and the inner cylinder 2.

Experiments were conducted as a simulation of joining the spring seat 11 and the outer cylinder 3 of the strut shown in FIG. 1. A sample was prepared by disposing two sheets of steel (JIS SAPH440) in an overlapping relationship as indicated in FIGS. 6(A) and 6(B) and FIGS. 8(A) and 8(B).

Drawing was conducted using the punch 34 and the die 37 as shown in FIGS. 6(A) and 6(B), or the punch 34' and the die 37 as shown FIGS. 8(A) and 8(B), to thereby form a joint portion. In each sample, as indicated in Table 1, the thickness of the sheet disposed on a side of the punch and the thickness of the sheet disposed on a side of the die were made different, and various combinations of sheets having different thicknesses were tested. With respect to the punches 34 and 34', the diameter was 10 mm. The radii (R) of curvature of distal end corners of the punches 34 and 34' were 42 mm and 2.0 mm, respectively. The depth of the die cavity 35 of the die 37 was 1.8 mm.

After drawing, a dimension measurement test, a shearing test and a peeling test were conducted. With respect to the joint portion of each sample, the minimum wall-thickness of the sheet on a side of the punch, the shear strength and the peeling resistance were determined. Results are shown in Table 1.

TABLE 1

| Sample No. | Type of joint portion | Thickness of sheet on a side of punch (mm) | Thickness of sheet on a side of die (mm) | Radius of curvature of distal end corner of punch (mm) | Forming load (kN) | Minimum wall-thickness (mm) | Shear strength (kN) | Peeling resistance (kN) |
|---|---|---|---|---|---|---|---|---|
| 1 | Laterally extruded shape | 2.60 | 2.40 | 0.2 | 83 | 0.47 | 5.15 | 3.13 |
| 2 | Laterally extruded shape | 2.96 | 1.10 | 0.2 | 83 | 1.1 | 5.62 | 3.10 |
| 3 | Laterally extruded shape | 2.96 | 2.60 | 0.2 | 83 | 1.3 | 5.44 | 2.56 |
| 4 | Cup-like shape | 2.96 | 2.60 | 2.0 | 38 | 1.6 | 21.11 | 0 |

As can be understood from Table 1, the shear strength of the joint portion having a cup-like shape (the second joint portion 22; FIG. 5) is about 4 times higher than that of the joint portion having a laterally extruded shape (the first joint portion 21; FIG. 3). The reason for this is that the minimum wall-thickness of the sheet (on a side of the punch) in the second joint portion 22 is larger than that in the first joint portion 21. Therefore, when high shear strength is required, it is necessary to form a joint portion having a cup-like shape. On the other hand, with respect to the peeling resistance, the joint portion having a laterally extruded shape has higher peeling resistance than the joint portion having a cup-like shape. Therefore, when high peeling resistance is required, it is necessary to form a joint portion having a laterally extruded shape.

As has been described in detail above, in an assembly of sheet materials and a tube assembly according to the above embodiment, both a first joint portion having a laterally extruded shape, which is excellent in peeling resistance, and a second joint portion having a cup-like shape, which is excellent in shear strength, are formed in the overlapping part of the sheets or tubular bodies. Therefore, the assembly of the present invention is capable of withstanding both a large peeling force and a large shearing force, and is therefore advantageously used for various applications.

Further, according to a drawing method and tools therefor in the above embodiment, the overlapping part of the walls of the tubular bodies is drawn, by means of punches and dies, simultaneously at a plurality of positions arranged in an equally angularly spaced relationship. Therefore, a forming pressure can be efficiently applied to the overlapping part, and the tubular bodies can be readily and reliably joined.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The entire disclosure of Japanese Patent Applications No. 2002-349206 filed on Nov. 29, 2002 and No. 2003-154795 filed on May 30, 2003 each including specification, claims, drawings and summary is incorporated herein by reference in its entirety.

What is claimed is:

1. A method of making a cylinder assembly comprising an outer cylinder and a tubular support member disposed around and in overlapping relation with the outer cylinder, the outer cylinder and the tubular support member being joined together, the method comprising:

forming an overlapping part by fitting the tubular support member over the outer cylinder;

inserting a die device including a die cavity into the outer cylinder so that the die cavity faces an outer cylinder inner surface of the overlapping part;

preparing a punch device including a stepped forward end portion, the stepped forward end portion comprising a cylindrical base portion, a tip portion having a tip end and a base portion side opposite the tip end, the tip portion being smaller in diameter than the base portion, and a curved surface portion connecting the base portion and the tip portion, the curved surface portion being concave inwardly of the stepped forward end portion, the cylindrical base portion smoothly merging into the tip portion through the curved surface portion, the tip portion extending from the base portion side of the tip portion to the tip end without the diameter of the tip portion being enlarged; and drawing the overlapping part by moving the punch device from a radially outer side of the tubular support member toward the die cavity of the die device until the curved surface portion of the punch device enters the tubular support member, thereby joining together the outer cylinder and the tubular support member, wherein the jointed overlapping part of the outer cylinder and the tubular support member are in contact with each other in a cup-like shape such that an angle of a tangent to the side wall inner surface of a recess of the outer cylinder, which is located forward relative to tubular support member in the drawing direction, is 90 degrees or less.

2. A method of making the cylinder assembly according to claim 1, wherein the tip portion of the punch device includes a taper portion.

3. A method of making the cylinder assembly according to claim 2, wherein the die device includes an annular groove formed in the circumferential edge of a bottom surface of the die cavity.

4. A method of making the cylinder assembly according to claim 2, wherein the thickness X2 of the bottom wall of a drawn portion formed by the drawing step is thicker than the thickness t1 of the outer cylinder, and is thinner than 1.5 times the thickness t1.

5. A method of making the cylinder assembly according to claim 2, wherein
the die device comprises a plurality of dies having the die cavities which are positioned on opposing sides of an axis of the overlapping portion,
the punch device comprises a plurality of punches associated with the dies, the punches being disposed on the opposing sides of the axis of the overlapping portion to face the die cavities, and
in the drawing step, a plurality of portions of the overlapping part are simultaneously deformed by moving the punches such that the tubular support member is secured to the outer cylinder by staking.

6. A method of making the cylinder assembly according to claim 5, wherein
the plurality of dies are radially reciprocally movable,
in the die inserting step, the dies are inserted into the outer cylinder with the dies moved to their retracted positions, and
the dies are subsequently radially moved to their working positions.

7. A method of making the cylinder assembly according to claim 1, wherein the die device includes an annular groove formed in the circumferential edge of a bottom surface of the die cavity.

8. A method of making the cylinder assembly according to claim 7, wherein the thickness X2 of the bottom wall of a drawn portion formed by the drawing step is thicker than the thickness t1 of the outer cylinder, and is thinner than 1.5 times the thickness t1.

9. A method of making the cylinder assembly according to claim 7, wherein
the die device comprises a plurality of dies having the die cavities which are positioned on opposing sides of an axis of the overlapping portion,
the punch device comprises a plurality of punches associated with the dies, the punches being disposed on the opposing sides of the axis of the overlapping portion to face the die cavities, and
in the drawing step, a plurality of portions of the overlapping part are simultaneously deformed by moving the punches such that the tubular support member is secured to the outer cylinder by staking.

10. A method of making the cylinder assembly according to claim 9, wherein
the plurality of dies are radially reciprocally movable,
in the die inserting step, the dies are inserted into the outer cylinder with the dies moved to their retracted positions, and
the dies are subsequently radially moved to their working positions.

11. A method of making the cylinder assembly according to claim 1, wherein the thickness X2 of the bottom wall of a drawn portion formed by the drawing step is thicker than the thickness t1 of the outer cylinder, and is thinner than 1.5 times the thickness t1.

12. A method of making the cylinder assembly according to claim 1, wherein
the die device comprises a plurality of dies having the die cavities which are positioned on opposing sides of an axis of the overlapping portion,
the punch device comprises a plurality of punches associated with the dies, the punches being disposed on the opposing sides of the axis of the overlapping portion to face the die cavities, and
in the drawing step, a plurality of portions of the overlapping part are simultaneously deformed by moving the punches such that the tubular support member is secured to the outer cylinder by staking.

13. A method of making the cylinder assembly according to claim 12, wherein
the plurality of dies are radially reciprocally movable,
in the die inserting step, the dies are inserted into the outer cylinder with the dies moved to their retracted positions, and
the dies are subsequently radially moved to their working positions.

14. A method of making the cylinder assembly according to claim 1, wherein the tubular support member of the joined overlapping part by drawing the overlapping part includes a minimum wall-thickness, and the minimum wall-thickness is about 30% or more of the wall-thickness of the tubular support member, which is not drawn.

15. A method of making the cylinder assembly according to claim 1, wherein the curved surface portion includes a proximal side having a first radius of curvature and a distal side having a second radius of curvature, the proximal side being smoothly connected with the distal side, and the second radius of curvature is larger than the first radius of curvature.

16. A method of making the cylinder assembly according to claim 1, wherein the overlapping part is drawn by moving the punch device without guiding the stepped forward end portion with a guide device provided around the stepped forward end portion.

* * * * *